(12) United States Patent
Bissacco et al.

(10) Patent No.: US 8,868,571 B1
(45) Date of Patent: *Oct. 21, 2014

(54) SYSTEMS AND METHODS FOR SELECTING INTEREST POINT DESCRIPTORS FOR OBJECT RECOGNITION

(75) Inventors: Alessandro Bissacco, Los Angeles, CA (US); Ulrich Buddemeier, Sebastopol, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/335,352

(22) Filed: Dec. 22, 2011

Related U.S. Application Data

(63) Continuation of application No. 12/404,857, filed on Mar. 16, 2009, now Pat. No. 8,086,616.

(60) Provisional application No. 61/037,170, filed on Mar. 17, 2008.

(51) Int. Cl.
*G06F 17/30* (2006.01)

(52) U.S. Cl.
USPC ............................ 707/751; 707/758; 707/772

(58) Field of Classification Search
CPC ................................................ G06F 17/30247
USPC ........................................... 707/751, 758, 772
See application file for complete search history.

(56) References Cited

U.S. PATENT DOCUMENTS

| | | | |
|---|---|---|---|
| 7,583,857 B2 * | 9/2009 | Xu et al. | 382/294 |
| 2003/0174877 A1 | 9/2003 | Aiger | |
| 2005/0013479 A1 * | 1/2005 | Xiao et al. | 382/159 |
| 2005/0131962 A1 | 6/2005 | Deshpande | |
| 2005/0207622 A1 * | 9/2005 | Haupt et al. | 382/118 |
| 2008/0127253 A1 | 5/2008 | Zhang et al. | |
| 2008/0159622 A1 | 7/2008 | Agnihotri et al. | |
| 2010/0104158 A1 | 4/2010 | Shechtman et al. | |
| 2011/0026853 A1 | 2/2011 | Gokturk et al. | |

\* cited by examiner

*Primary Examiner* — Etienne Leroux
*Assistant Examiner* — Cindy Nguyen
(74) *Attorney, Agent, or Firm* — Fish & Richardson P.C.

(57) ABSTRACT

Systems and methods for selecting interest point descriptors for object recognition. In an embodiment, the present invention estimates performance of local descriptors by (1) receiving a local descriptor relating to an object in a first image; (2) identifying one or more nearest neighbor descriptors relating to one or more images different from the first image, the nearest neighbor descriptors comprising nearest neighbors of the local descriptor; (3) calculating a quality score for the local descriptor based on the number of nearest neighbor descriptors that relate to images showing the object; and (4) determining, on the basis of the quality score, if the local descriptor is effective in identifying the object.

18 Claims, 8 Drawing Sheets

SYSTEMS AND METHODS FOR SELECTING INTEREST POINT DESCRIPTORS FOR OBJECT RECOGNITION

CROSS REFERENCE TO RELATED APPLICATIONS

The present application claims the benefit of U.S. Provisional Patent Application No. 61/037,170, filed on Mar. 17, 2008, and U.S. Non-Provisional patent application Ser. No. 12/404,857, filed on Mar. 16, 2009, both of which are incorporated herein by reference in their entirety.

FIELD OF THE INVENTION

The present invention relates to recognizing objects in an image.

BACKGROUND

Current visual object recognition approaches use local descriptors to identify objects in an image. The local descriptors are usually extracted at specific locations in the image by interest point detectors. The interest point detectors find points in an image that can be characterized as having a clear, mathematically well-founded definition, a well-defined position in the image space, a rich local image structure, such that the point simplifies any further processing, and stability during deformations or illumination variations. Such characteristics are described in local descriptors. Objects can be recognized across images by matching these local descriptors.

However, many local descriptors often match common local structures in many different objects. This generates false matches when identifying objects in images. Some local descriptors never participate in any match. Such local descriptors impose computational and memory overhead for object recognition.

BRIEF SUMMARY

This invention relates to object recognition in an image. A system embodiment of this invention estimates the performance of a local descriptor relating to an object in an image. A system embodiment includes a descriptor processor and a score calculator. The descriptor processor is configured to receive a local descriptor relating to an object in the image. This processor is also configured to receive nearest neighbor descriptors relating to one or more images different from the image, where the nearest neighbor descriptors comprise nearest neighbors of the local descriptor. This processor is further configured to determine the efficacy of the local descriptor in identifying the object based on a quality score of the local descriptor. The score calculator communicates with the descriptor processor and is configured to calculate the quality score based on the number of nearest neighbor descriptors that relate to images showing the object. The score calculator is further configured to provide the quality score to the descriptor processor.

A method embodiment of this invention estimates the performance of a local descriptor. The method embodiment includes receiving a local descriptor relating to an object in a first image, and identifying one or more nearest neighbor descriptors relating to one or more images different from the first image, where the nearest neighbor descriptors comprises nearest neighbors of the local descriptor. The method further includes the stages of calculating a quality score for the local descriptor based on the number of nearest neighbor descriptors that relate to images showing the object, and determining, on the basis of the quality score, if the local descriptor is effective in identifying the object.

In this way, local descriptors for a given image can be evaluated to determine how well they may perform as image object classifiers. Those local descriptors that are known to never participate in matches, as well as those local descriptors that generate false matches, can be discarded, improving object recognition performance and efficiency.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to visual object recognition. This can include identifying local descriptors that best classify an object. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for estimating performance of local descriptors in greater detail.

System

Figure 1:
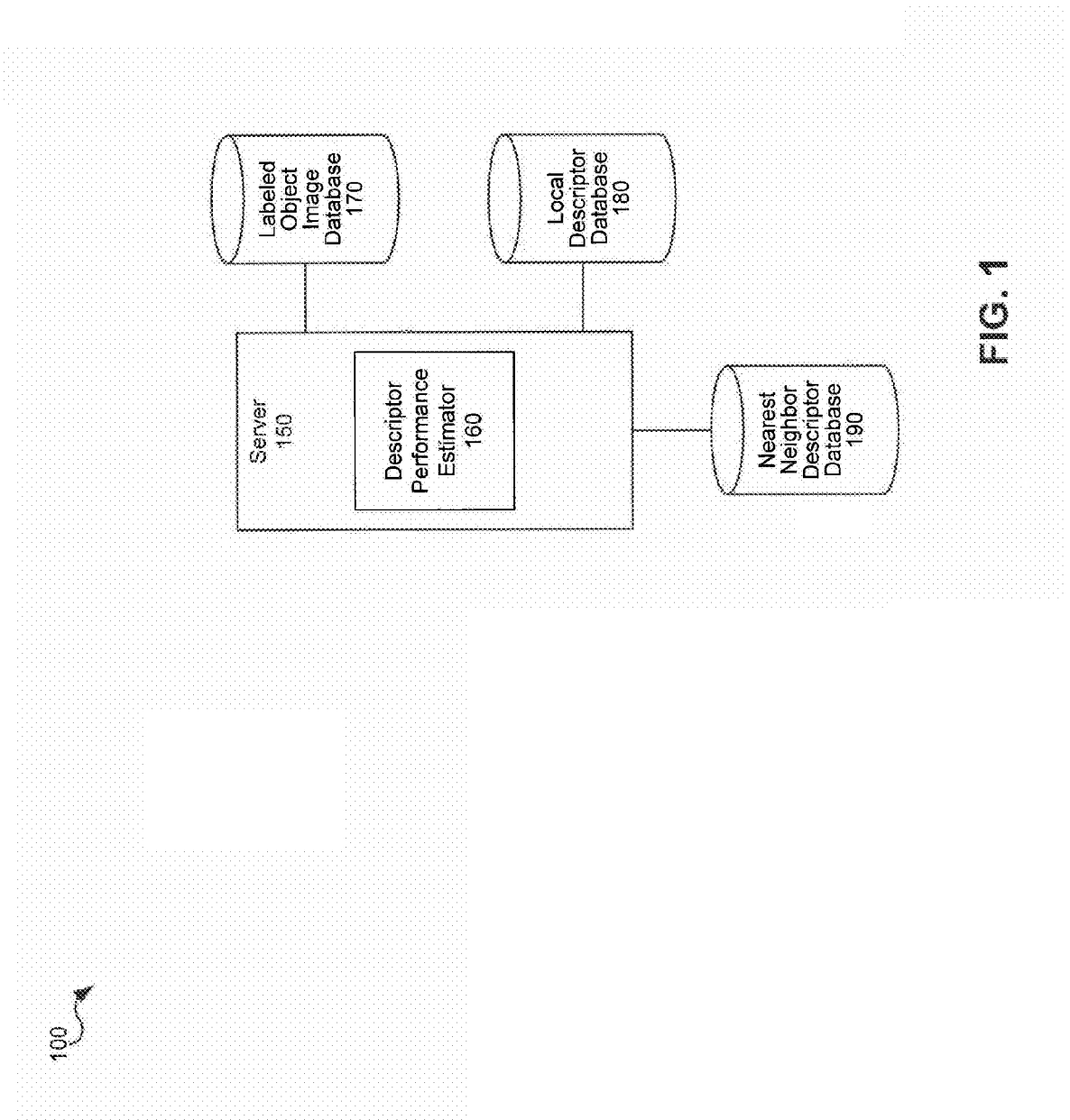
FIG. 1 is an architecture diagram of a system for estimating local descriptor performance according to an embodiment of the present invention.

This section describes a system suitable for estimating performance of a local descriptor. FIG. 1 is an architecture diagram of a system for estimating local descriptor performance according to an embodiment of the present invention, FIG. 1 shows system 100. System 100 includes a server 150, a labeled object image database 170, a local descriptor database 180, and a nearest neighbor descriptor database 190. As used herein, the term "database" includes, but is not limited to, table databases, hierarchical databases, network databases, telational databases, dimensional databases, and object databases. Moreover, any two or more of databases 170, 180, and 190 may be implemented as a single database in an alternative embodiment.

Each of server 150, labeled object image database 170, local descriptor database 180, and nearest neighbor descriptor database 190 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing, device may include software, firmware, hardware, or a combination thereof. Software may include one or more applications and an operating system. Hardware can include, but is not limited to, a processor, memory and graphical user interface display.

Server 150, labeled object image database 170, local descriptor database 180, and nearest neighbor descriptor database 190 may be implemented on one or more computing devices at the same or at different locations. For instance, server 150, labeled object image database 170, local descriptor database 180, and nearest neighbor descriptor database 190 may be remote from one another on different computing devices coupled to a network. In still another example, server 150, labeled object image database 170, local descriptor database 180, and nearest neighbor descriptor database 190 may be implemented on one or more computing devices at a common location and coupled to a remote client over the network. In an embodiment, not shown, labeled object image database 170, local descriptor database 180, and nearest neighbor descriptor database 190 resides within memory in server 150. Other combinations and configurations for arranging server 150, labeled object image database 170, local descriptor database 180, and nearest neighbor descriptor database 190 may be used as would be apparent to a person skilled in the art given this description.

The network, not shown, may be any network or combination of networks that can carry data communication. Such a network can include, but is not limited to, a local area network, medium area network, and/or wide area network such as the Internet. The network can support protocols and technology including, but not limited to, World Wide Web protocols and/or services. Intermediate web servers, gateways, or other servers may be provided between components of system 100 depending upon a particular application or environment.

In one exemplary embodiment, server 150 may include a web server or may be coupled to communicate with a web server at the same or a different location. A web server may be a software component that responds to a hypertext transfer protocol (HTTP) request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language (XML), documents, videos, images, multimedia features, or any combination thereof. This example is strictly illustrative and does not limit the present invention.

Labeled object image database 170 contains one or more labeled object images. Each image in labeled object image database 170 contains a corresponding object label that identifies the object shown in the respective image. As an example, the object label may be some text that identifies a name or location of an object in the image. In an embodiment, labeled object image database 170 contains images that originated from user generated content, searches performed over the Internet, or from any other means that would be apparent to a person skilled in the relevant art. In the user generated content example, users may provide the object labels. For the searches performed over the Internet, the images may have pre-determined object labels, such as the query term used to find the particular images.

Local descriptor database 180 contains a set of local descriptors that correspond to a given image. In an embodiment, the local descriptors are generated using compact normalized Gabor sampling. Compact normalized Gabor sampling is described in greater detail in application Ser. No. 12/049,841, filed Mar. 17, 2008, entitled "Methods and Systems for Descriptor Vector Computation," which is incorporated herein by reference in its entirety. Local descriptor database 180 may or may not contain local descriptors that correspond to an image found in labeled object image database 170. Likewise, local descriptor database 180 may contain local descriptors that correspond to an image not found in labeled object image database 170. In an embodiment, local descriptors are extracted at specific locations and scales from their respective images using an interest point detector. The interest point detector, not shown, may be present in any server, such as server 150. As an example, and not to limit the present invention, the interest point detector may be a Laplacian of Gaussian (LoG) interest point detector, a Difference of Gaussians (DoG) interest point detector, or a Determinant of Hessian (DoH) interest point detector. LoG, DoG, and DoH interest point detectors are well-known in the art for detecting interest points and/or regions in images. The interest point detector may or may not require user input.

Nearest neighbor descriptor database 190 contains local descriptors that are nearest neighbors of a local descriptor. In an embodiment, the nearest neighbor descriptors are those local descriptors that have similar colors, shapes, textures, or any other image characteristics to the local descriptor. Nearest neighbor descriptor database 190 may contain local descriptors for the nearest neighbors of local descriptors not found in local descriptor database 180. Likewise, nearest neighbor descriptor database 190 may not contain descriptors for the nearest neighbors for some local descriptors present in local descriptor database 180. The nearest neighbor descriptors for a local descriptor may be computed with a kd-tree, with the local descriptor functioning as the root of the kd-tree and the nearest neighbor descriptors sorted based on their similarity. As will be explained in greater detail below, the nearest neighbor descriptors are those local descriptors present in images other than the image from which the local descriptor originated. Each nearest neighbor descriptor includes a label that corresponds to its originating image.

In an embodiment, the images from which the nearest neighbor descriptors originate are part of a training dataset used to determine an eventual quality score and/or weighted quality score for the particular local descriptor. Quality scores and weighted quality scores are described in greater detail below. Note that a greater number of images used in the training dataset may help improve the identification rate of objects in other images when running an object recognition system or the like.

In an embodiment, the number of nearest neighbor descriptors stored in nearest neighbor descriptor database 190 for a given local descriptor is capped. For example, the number of nearest neighbor descriptors stored in nearest neighbor descriptor database 190 may be less than the total number of nearest neighbor descriptors calculated using the kd-tree and set at a fixed ratio, such as 32:1. In an alternate embodiment, the number of nearest neighbor descriptors stored in nearest neighbor descriptor database 190 may vary for each local descriptor.

According to an embodiment, server 150 includes descriptor performance estimator 160. Automatically, or at a request, descriptor performance estimator 160 identifies those local descriptors that may best identify objects in an image. The request may be made by a user, another module that may be present in server 150, or another module that may be present on a remote server. Descriptor performance estimator 160 may send its results to another module on server 150, to another module on a remote server over a network, or to local descriptor database 180.

Descriptor performance estimator 160 receives an image from labeled object image database 170. Automatically, or at the request of a different module, descriptor performance estimator 160 sends a query to local descriptor database 180 based on the image. The different module may be present in server 150 or a remote server. Descriptor performance estimator 160 then sends a query, based on the results returned by local descriptor database 180, to nearest neighbor descriptor database 190. Descriptor performance estimator 160 can then identify those local descriptors that may best identify objects in the image based on the results returned by nearest neighbor descriptor database 190.

Descriptor performance estimator 160 may be implemented as software, hardware, firmware, or any combination thereof.

Figure 2:
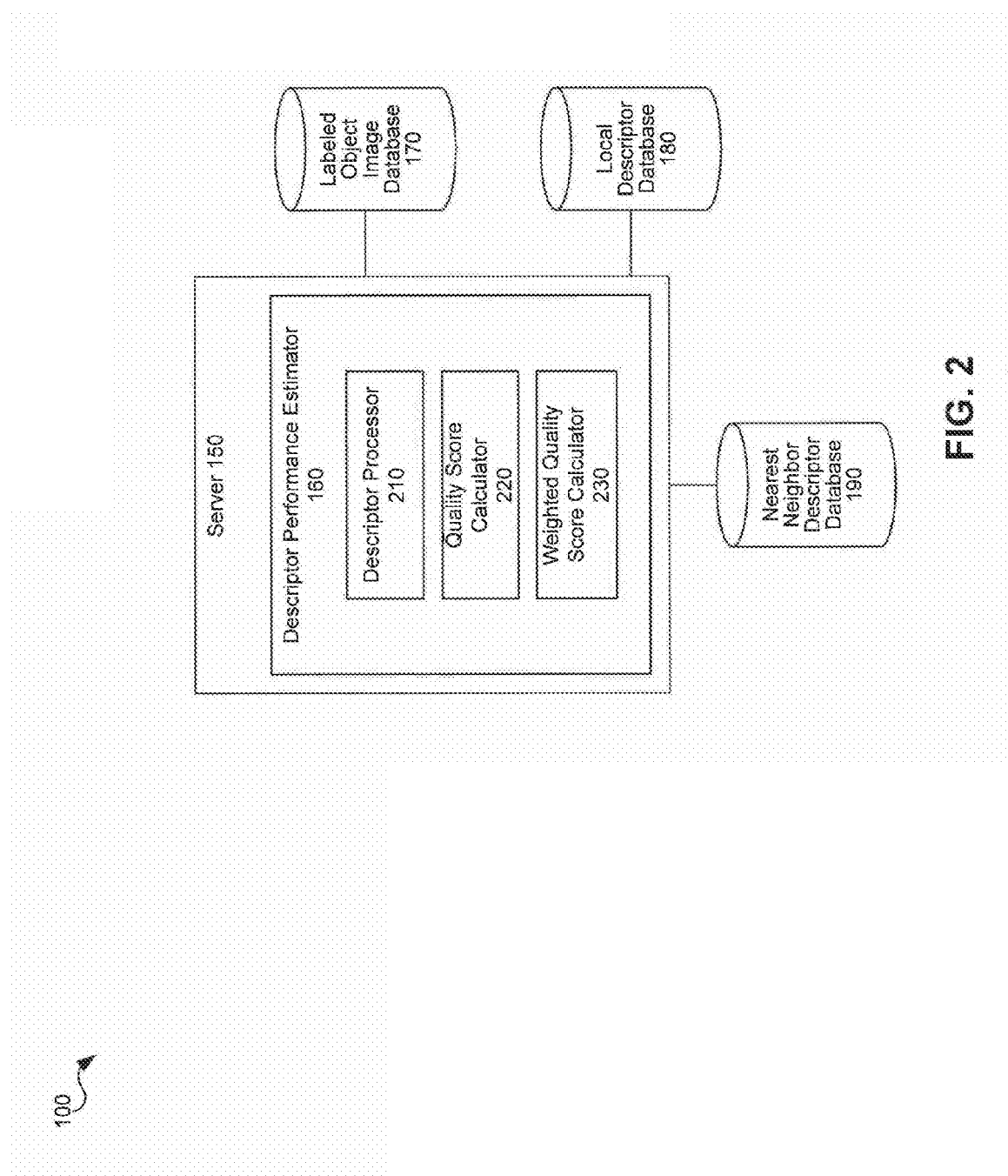
FIG. 2 is a more detailed diagram of the components of the system in FIG. 1, according to an embodiment of the present invention.

FIG. 2 is a more detailed diagram of the components of system 100 in FIG. 1, according to an embodiment of the present invention. As shown in FIG. 2, server 150 may communicate with labeled object image database 170, local descriptor database 180, and nearest neighbor descriptor database 190. As discussed previously, this communication may take place over one or more networks, such as the Internet.

In an embodiment, descriptor performance estimator 160 includes a descriptor processor 210, a quality score calculator 220, and a weighted quality score calculator 230. In an alternate embodiment, not shown, descriptor performance estimator 160 includes descriptor processor 210 and one of quality score calculator 220 and weighted quality score calculator 230. As described herein, both quality score calculator 220 and weighted quality score calculator 230 are present in descriptor performance estimator 160. Descriptor processor 210 generates a local descriptor query based on a received image and generates a nearest neighbor descriptor query based on a received local descriptor. Quality score calculator 220 produces a quality score based on the local descriptor and the received nearest neighbor descriptors. Weighted quality score calculator 230 produces a weighted quality score based on the local descriptor and the nearest neighbor descriptors. Descriptor processor 210 then collects the quality score and the weighted quality score for further processing.

In an embodiment, quality score calculator 220 calculates a quality score by comparing a label of the received local descriptor and labels for each of the received nearest neighbor descriptors, where the labels refer to objects related to the respective descriptors. One possible equation to determine the quality score is as follows:

$$q(x_i) = \frac{K}{m} \qquad (1)$$

where q is the quality score, x, is a local descriptor, m is the total number of nearest neighbor descriptors, and K is the total number of nearest neighbor descriptors that have a label equivalent to the label of local descriptor $x_i$.

In an alternate embodiment, not shown, instead of counting the number of nearest neighbor descriptors that have labels matching with the local descriptor, the total number of groups or clusters of nearest neighbor descriptors that have labels matching any of the local descriptors for the object may be counted to derive a quality score or weighted quality score. This count can include both true and false matches, where false matches are those common local structures that appear in many objects.

In an embodiment, weighted quality score calculator 230 calculates a weighted quality score by comparing a label of the received local descriptor and labels for the received nearest neighbor descriptors and by taking into account similarities between the local descriptor and the received nearest neighbor descriptors. The nearest neighbor descriptors are sorted according to their similarities to the local descriptor. One possible equation to determine the weighted quality score is as follows:

$$qw(x_i) = \frac{2}{m(m+1)} \sum_{j=0}^{m-1} (m-j) \ \forall \ j : c(y_j) = c(x_i) \qquad (2)$$

where qw is the weighted quality score, $x_i$ is a local descriptor, m is the total number of nearest neighbor descriptors, $y_j$ is a nearest neighbor descriptor, and c(N) is a label of descriptor N. The difference (m−j) is included in the sum only if the chosen nearest neighbor descriptor $y_j$ has a label equivalent to the label of local descriptor $x_i$. As mentioned above, a kd-tree may be used to organize the nearest neighbors, which results in a sorted list of nearest neighbor descriptors. Because of this, the nearest neighbor descriptor identified by $y_0$ may be considered the closest or most similar to $x_i$ out of all m nearest neighbor descriptors. Likewise, the nearest neighbor descriptor identified by $y_{m-1}$ may be considered the farthest or most different from $x_i$ out of all m nearest neighbor descriptors. Therefore the closer or more similar a nearest neighbor descriptor is to the local descriptor, the greater influence it has on the final weighted quality score.

Note that in the above embodiment, both quality scores and weighted quality scores have values that range from zero to one. These upper and lower bounds help normalize the scores, such that a difference in the number of nearest neighbor descriptors does not skew the results for a local descriptor for a first image when compared to a local descriptor for a second image. Having the same upper and lower bounds also allows for comparisons between the quality score and the weighted quality score if so desired. And finally, the upper and lower bounds allow absolute thresholds to be set when determining which local descriptors to keep and which to discard.

Also note that for the case where descriptor labels include text, the text may not have to match exactly to indicate a match. In an embodiment, not shown, variants or synonyms may be taken into account when the labels are compared by looking up such variants or synonyms in a database. Singular and plural versions of words may also be treated as equivalent for the purpose of matching.

Each of descriptor processor 210, quality score calculator 220, and weighted quality score calculator 230 may be implemented as software, hardware, firmware, or any combination thereof.

Figure 3:
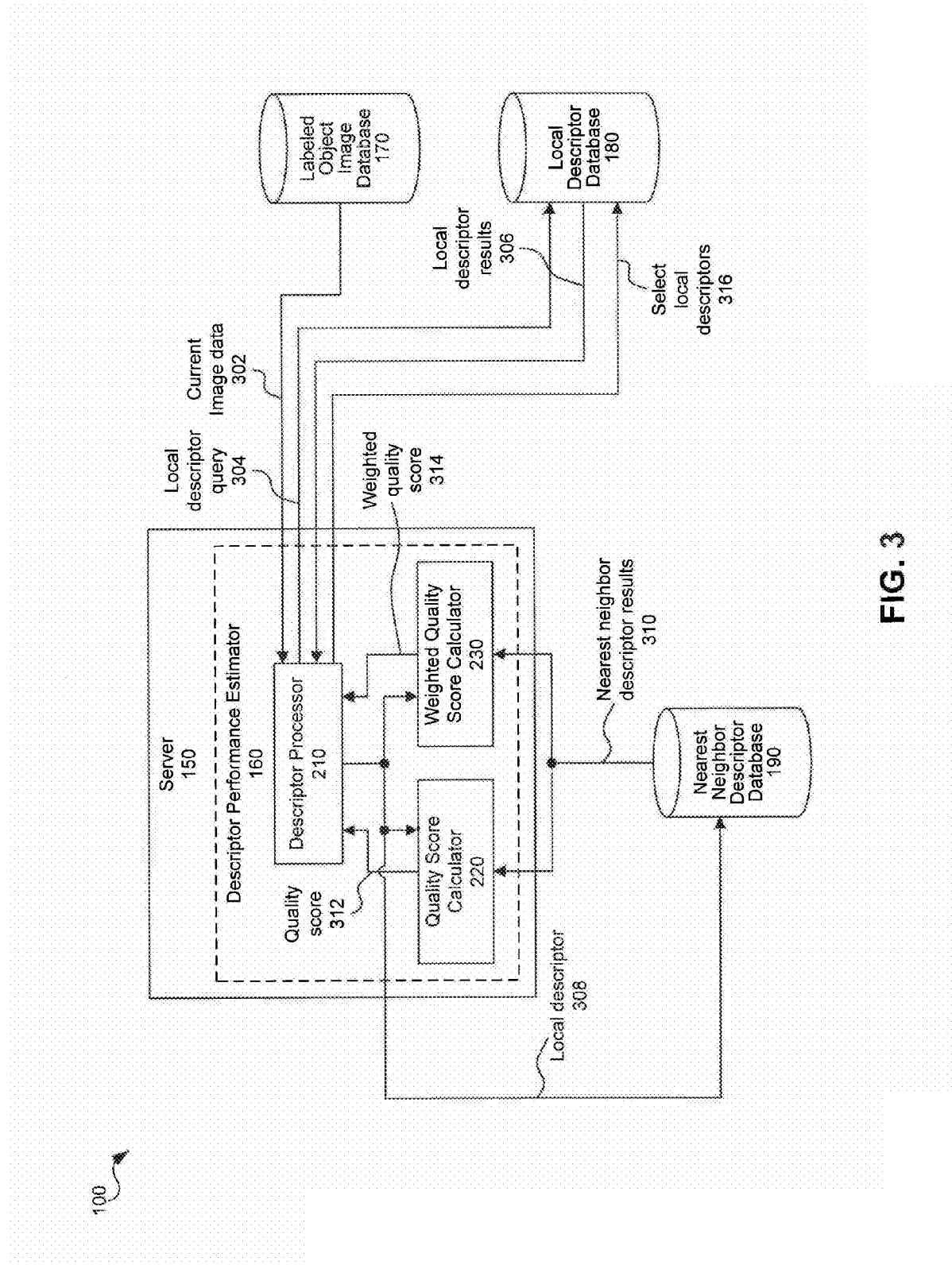
FIG. 3 is a diagram that displays how components of the system in FIG. 1 may interoperate, according to an embodiment of the present invention.

FIG. 3 is a diagram that displays how components of system 100 in FIG. 1 may interoperate, according to an embodiment of the present invention. In an embodiment, labeled object image database 170 sends current image data 302 to descriptor processor 210. Current image data 302 includes an image in any format known to those skilled in the art and at least one label associated with the image. In an example, the label may include, but is not limited to, a word or a set of words that describe one or more objects in the image.

Descriptor processor 210 takes current image data 302 and sends a local descriptor query 304 to local descriptor database 180. Local descriptor query 304 may include the image from current image data 302 or a property of the image that uniquely identifies it. For example, the property of the image may be a unique ID assigned to the image.

Local descriptor database 180 sends local descriptor results 306 to descriptor processor 210 in response to local descriptor query 304. In an embodiment, local descriptor results 306 include at least one local descriptor that corresponds to the image. In an alternate embodiment, local descriptor results 306 include no local descriptors that correspond to the image. In this case, no local descriptors for the image can be evaluated since none have been found and the process ends. As described herein, it is assumed that local descriptor results 306 include at least one local descriptor.

Descriptor processor 210 sends local descriptor 308 to nearest neighbor descriptor database 190, quality score calculator 220 and weighted quality score calculator 230. Local descriptor 308 includes one of the local descriptors included in local descriptor results 306. Descriptor processor 210 may send multiple local descriptors 308 until all local descriptors included in local descriptor results 306 have been sent once. In an embodiment, a second local descriptor 308 is sent after the first local descriptor 308 has been completely analyzed. In an alternate embodiment, not shown, all local descriptors 308 are sent in parallel such that each local descriptor included in local descriptor results 306 is analyzed in parallel.

Nearest neighbor descriptor database 190 takes local descriptor 308 and outputs nearest neighbor descriptor results 310. Both quality score calculator 220 and weighted quality score calculator 230 receive nearest neighbor descriptor results 310.

Using local descriptor 308 and nearest neighbor descriptor results 310, quality score calculator 220 performs the quality score calculations as described above. In an embodiment, quality score calculator 220 sends a quality score for the local descriptor included in local descriptor 308 to descriptor processor 210 in the form of quality score 312. In a second embodiment, quality score calculator 220 only sends quality score 312 to descriptor processor 210 if the calculated quality score exceeds a pre-determined quality score threshold. For example, quality score 312 may be sent to descriptor processor 210 if the quality score is equal to or larger than 0.05. In a third embodiment, quality score 312 may be sent to descriptor processor 210 if the quality score exceeds some quality score threshold determined by previously calculated quality scores. In a fourth embodiment, not shown, quality score 312 may be sent once all quality scores have been calculated. In a fifth embodiment, not shown, quality score 312 may be sent once all quality scores have been calculated, where the quality scores included in quality score 312 are those quality scores that exceeded some pre-determined quality score threshold, such as, for example, 0.05. In a sixth embodiment, not shown, quality score 312 may be sent once all quality scores have been calculated, where the quality scores included in quality score 312 are those quality scores that are the top X quality scores. For example, the ten highest quality scores may be those included in quality score 312.

Using local descriptor 308 and nearest neighbor descriptor results 310, weighted quality score calculator 230 performs the weighted quality score calculations as described above. In an embodiment, weighted quality score calculator 230 sends a weighted quality score for the local descriptor included in local descriptor 308 to descriptor processor 210 in the form of weighted quality score 314. In a second embodiment, weighted quality score calculator 230 only sends weighted quality score 314 to descriptor processor 210 if the calculated weighted quality score exceeds a pre-determined quality score threshold. For example, weighted quality score 314 may be sent to descriptor processor 210 if the weighted quality score is equal to or larger than 0.0645. In a third embodiment, weighted quality score 314 may be sent to descriptor processor 210 if the weighted quality score exceeds some quality score threshold determined by previously calculated weighted quality scores. In a fourth embodiment, not shown, weighted quality score 314 may be sent once all weighted quality scores have been calculated. In a fifth embodiment, not shown, weighted quality score 314 may be sent once all weighted quality scores have been calculated, where the weighted quality scores included in weighted quality score 314 are those weighted quality scores that exceeded some pre-determined quality score threshold, such as, for example, 0.0645. In a sixth embodiment, not shown, weighted quality score 314 may be sent once all weighted quality scores have been calculated, where the weighted quality scores included in weighted quality score 314 are those weighted quality scores that are the top X weighted quality scores. For example, the ten highest weighted quality scores may Le those included in weighted quality score 314.

Once quality score calculator 220 and weighted quality score calculator 230 have completed their operations, descriptor processor 210 analyzes any results received. Descriptor processor 210 may use quality score 312 and/or weighted quality score 314 to analyze the performance of a given local descriptor. For example, descriptor processor 210 may determine that the given local descriptor performs well as an image object classifier if both its quality score and weighted quality score exceed some threshold. If one score is below the threshold, including the case where one or both scores are not sent to descriptor processor 210, then the given local descriptor may be tagged as a local descriptor that does not perform well as an image object classifier. In a second example, descriptor processor 210 may determine that the given local descriptor performs well as an image object classifier as long as it receives quality score 312 and weighted quality score 314. In a third example, descriptor processor 210 may determine that the given local descriptor performs well as an image object classifier if one or both of quality score 312 and weighted quality score 314 exceed some threshold.

Those local descriptors that do not perform well as image object classifiers may be physically or logically separated from the rest of the local descriptors and may be discarded. Those local descriptors that do perform well as image object classifiers may be packaged together to form select local descriptors 316. In an embodiment, descriptor processor 210 sends select local descriptors 316 and local descriptor query 304 to local descriptor database 180 in order to update and/or replace the local descriptors that correspond to the image included in current image data 302 with select local descriptors 316. In an alternate embodiment, not shown, descriptor processor 210 sends select local descriptors 316 to another module in server 150 or in a remote server to aid in another process, such as, object recognition.

In an alternate embodiment, not shown, no local descriptor may be discarded based on its quality score or weighted quality score. Instead, the quality score and/or weighted quality score may be used to weight each descriptor individually so as to produce descriptor confidence scores. These confidence scores can then be used to give a more nuanced description of the objects in images.

In this way, the image can be associated with local descriptors that more accurately classify objects located within the image, which can result in increased performance for object recognition systems and the like.

Method

Figure 4:
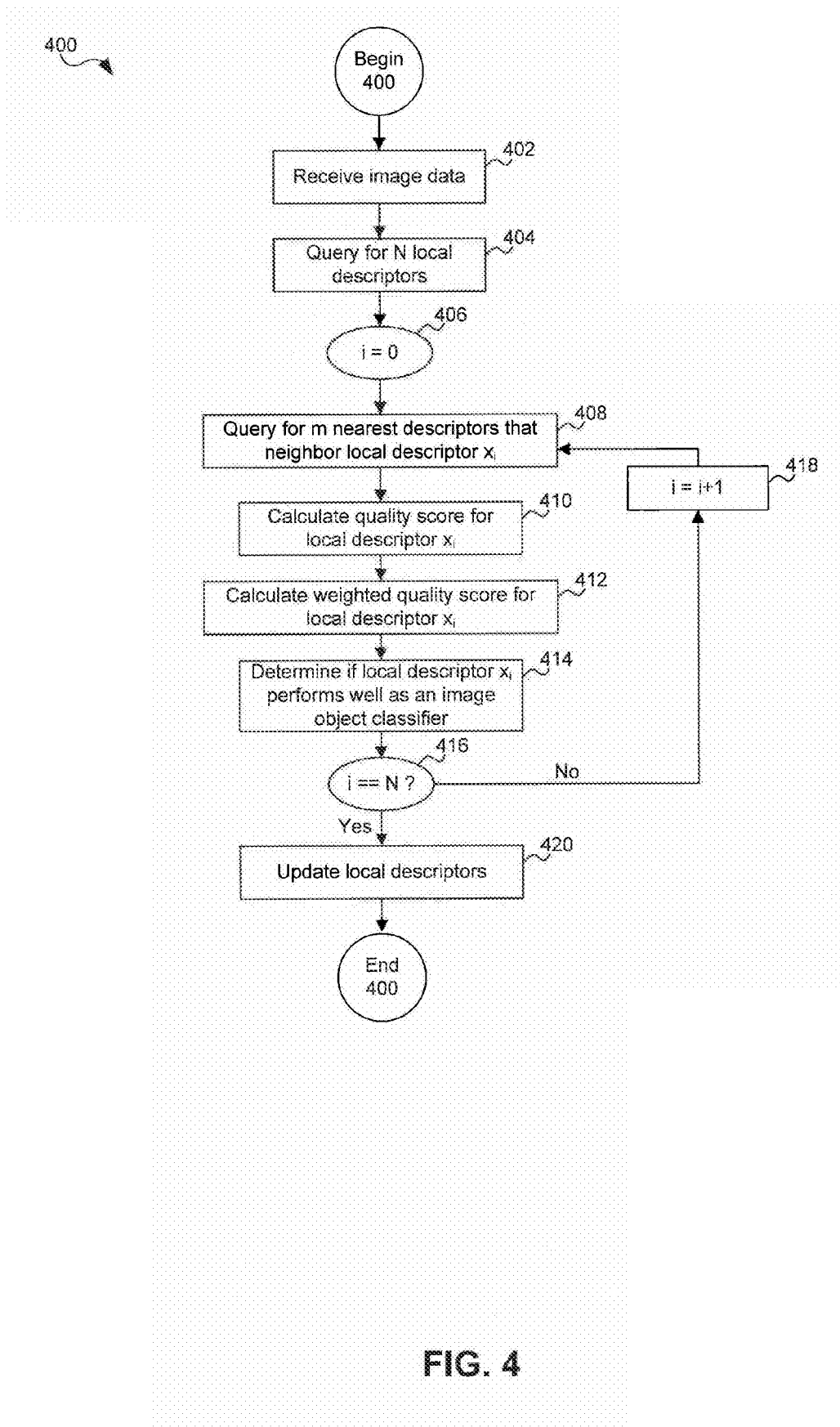
FIG. 4 is a flowchart of a method for estimating local descriptor performance according to an embodiment of the present invention.

This section describes a method used for estimating performance of local descriptors. FIG. 4 is a flowchart of a method 400 for estimating performance of local descriptors according to an embodiment of the present invention. While method 400 is described with respect to an embodiment of the present invention, method 400 is not meant to be limited to the present invention and may be used in other applications. In an example, method 400 may be used to update local descriptor database 180 from FIGS. 1-3. However, method 400 is not meant to be limited to manipulation of a local descriptor database.

As shown in FIG. 4, method 400 begins at stage 402 where an image is received. In an embodiment, the image may be received from a database, such as labeled object image database 170 from FIGS. 1-3. Once stage 402 is complete, method 400 proceeds to stage 404.

At stage 404, a query is performed and N local descriptors corresponding to the image are received. In an embodiment, the query may be performed on a database, such as local descriptor database 180.

Method 400 proceeds to stage 406 once stage 404 is complete. At stage 406, variable i is set to zero. Variable i represents the index of a local descriptor x, in the N local descriptors. Once stage 406 is complete, method 400 proceeds to stage 408.

At stage 408, a query is performed to find the m nearest neighbor descriptors of local descriptor $x_i$. The m nearest neighbor descriptors may be found using a kd-tree. In an embodiment, the query may be performed on a database, such as nearest neighbor descriptor database 190 from FIGS. 1-3. Once stage 408 is complete, method 400 proceeds to stage 410.

At stage 410, a quality score for local descriptor $x_i$ is calculated based on a label of local descriptor $x_i$ and labels of the m nearest neighbor descriptors. Stage 410 is described in more detail below with respect to FIG. 5A. Once stage 410 is complete, method 400 proceeds to stage 412.

At stage 412, a weighted quality score for local descriptor $x_i$ is calculated based on the label of local descriptor $x_i$ and the labels of the m nearest neighbor descriptors. Stage 412 is described in more detail below with respect to FIG. 5B. Once stage 412 is complete, method 400 proceeds to stage 414.

In an alternate embodiment, not shown, one of stage 410 and stage 412 may be completed. If a quality score is to be calculated, method 400 jumps to stage 414 once stage 410 is complete. If a weighted quality score is to be calculated, method 400 jumps from stage 408 to stage 412. Once stage 412 is complete, method 400 continues to stage 414.

In another embodiment, not shown, stage 410 and stage 412 may be performed in parallel.

At stage 414, a determination is made as to whether local descriptor x, performs well as an image object classifier. In an embodiment, the determination is made based on the calculated quality score and/or the calculated weighted quality score of stages 410 and 412, respectively. Once stage 414 is complete, method 400 proceeds to stage 416.

At stage 416, a check is performed to see if i equals to N. If i and N are equal, method 400 jumps to stage 420. If i and N are not equal, method 400 proceeds to stage 418.

In an alternate embodiment, not shown, stage 414 may be completed anytime after stage 416 and before stage 420. If stage 414 is completed after stage 416, then all local descriptors may be checked at once according to several thresholds or their rank, as described above.

At stage 418, i is incremented by one. Once this is complete, method 400 returns to stage 408.

At stage 420, in an embodiment, those local descriptors that performed well as image object classifiers are used to update and/or replace the local descriptors previously found in a database, such as local descriptor database 180. Once stage 420 is complete, method 400 ends.

Stages 402, 404, 406, 408, 410, 412, 414, 416, 418, and 420 may be implemented as software, hardware, firmware, or any combination thereof.

Figure 5A:
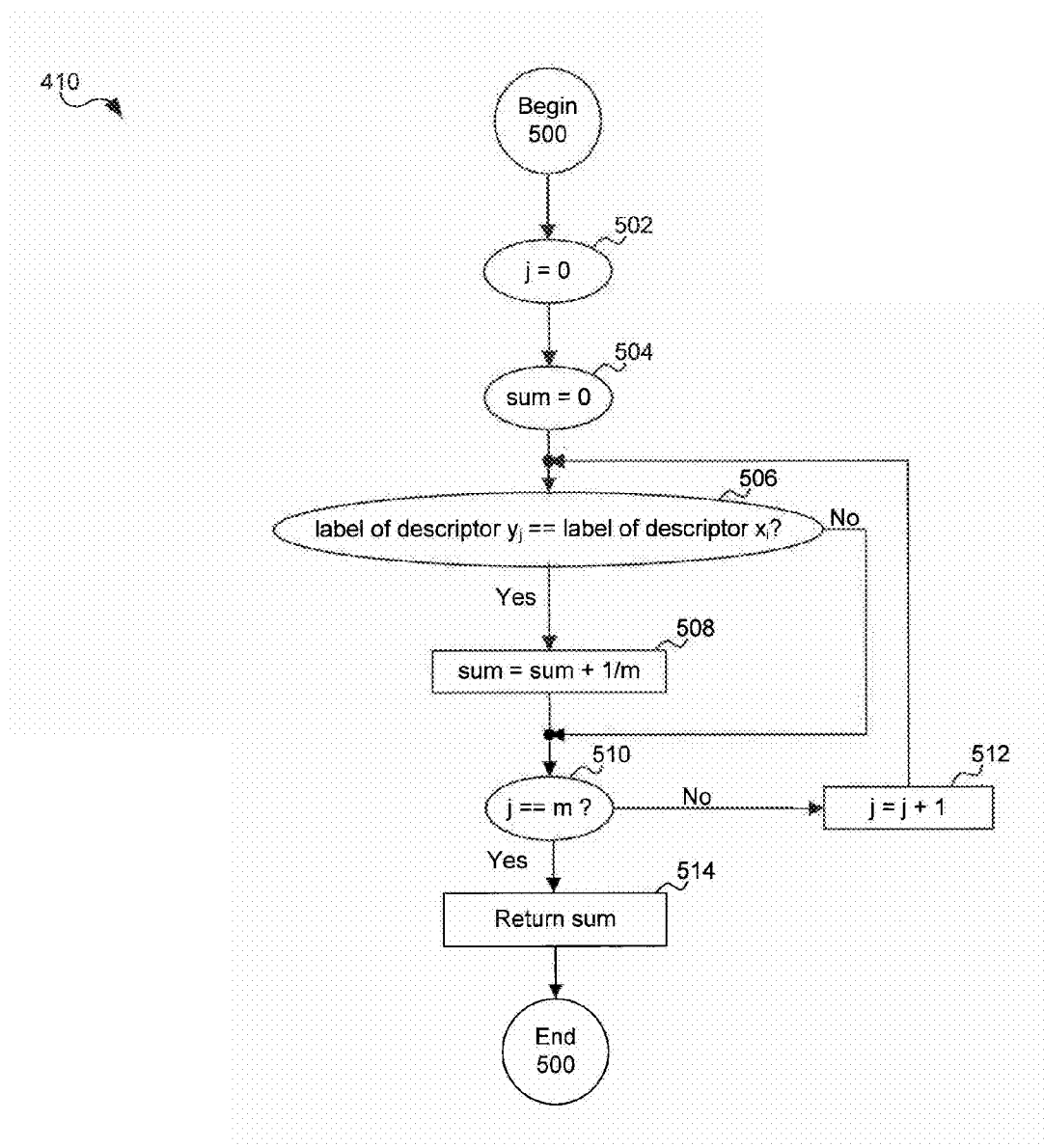
FIGS. 5A and 5B are more detailed flowcharts of the stages of the method in FIG. 4 according to an embodiment of the present invention.

FIG. 5A is a flowchart of a method 500 for calculating a quality score according to an embodiment of the present invention. While method 500 is described with respect to an embodiment of the present invention, method 500 is not meant to be limited to the present invention and may be used in other applications. In an example, method 500 may be used to calculate a quality score in quality score calculator 220 as described above and in FIGS. 1-3. This method may be implemented during stage 410 of method 400 from FIG. 4. However, method 500 is not meant to be limited to quality score calculator 220.

As shown in FIG. 5A, method 500 begins at stage 502 where variable j is set to zero.

Once stage 502 is complete, method 500 proceeds to stage 504 where variable sum is set to zero. In an alternate embodiment, not shown, stage 504 may be completed before stage 502. Once stage 504 is complete, method 500 proceeds to stage 506.

At stage 506, a check is performed to see if the label of the nearest neighbor descriptor $y_j$ is equivalent to the label of the local descriptor $x_i$, where i is the value as determined in method 400 from FIG. 4. If the labels are equal, method 500 proceeds to stage 508. If the labels are not equal, method 500 jumps to stage 510.

At stage 508, sum is incremented by its previous value plus one over the total number of nearest neighbor descriptors, where the total number of nearest neighbor descriptors is equal to m, as described above in method 400. Once this is complete, method 500 proceeds to stage 510.

At stage 510, a check is performed to see if j equals to m. If j and m are equal, method 500 jumps to stage 514. If j and m are not equal, method 500 proceeds to stage 512.

At stage 512, j is incremented by one. Once this is complete, method 500 returns to stage 506.

At stage 514, sum is returned as the quality score of local descriptor $x_i$. Once this is complete, method 500 ends.

Stages 502, 504, 506, 508, 510, 512, and 514 may be implemented as software, hardware, firmware, or any combination thereof.

Figure 5B:
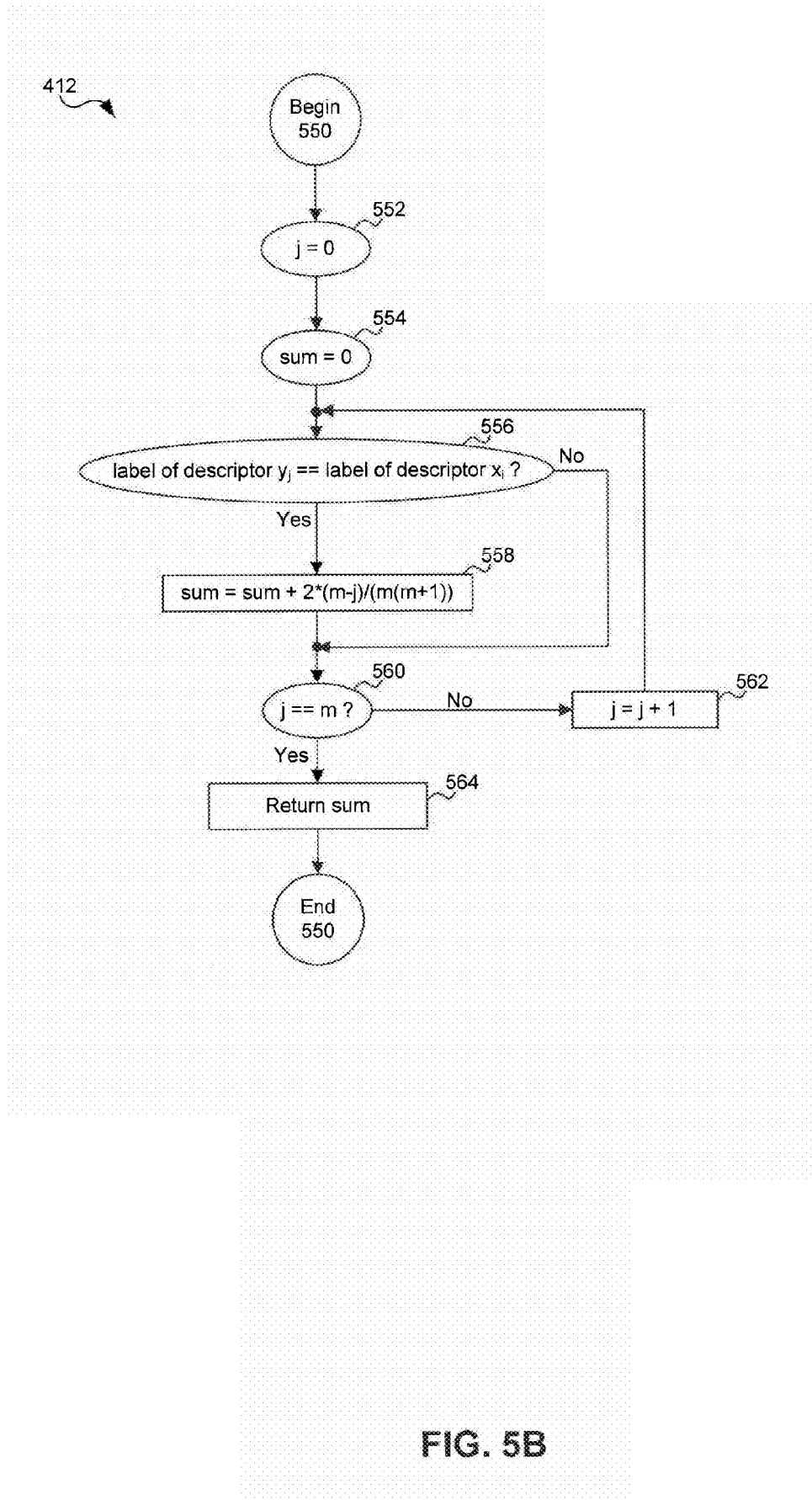

FIG. 5B is a flowchart of a method 550 for calculating a weighted quality score according to an embodiment of the present invention. While method 550 is described with respect to an embodiment of the present invention, method 550 is not meant to be limited to the present invention and may be used in other applications. For example, method 550 may be used to calculate a weighted quality score in weighted quality score calculator 230 from FIGS. 1-3. This method may be implemented during stage 412 of method 400 from FIG. 4. However, method 550 is not meant to be limited to weighted quality score calculator 230.

As shown in FIG. 5B, method 550 begins at stage 552 where variable j is set to zero. As is described below, j represents the index of a nearest neighbor descriptor $y_j$ of local descriptor $x_i$, where i is the value as determined in method 400 from FIG. 4. Since, as described above, the nearest neighbor descriptors may be computed using a kd-tree, the nearest neighbor descriptors are arranged in a sorted order, from closest to farthest from the respective local descriptor. In an embodiment, nearest neighbor descriptor $y_j$, with j being zero, is the closest nearest neighbor descriptor to the respective local descriptor.

Once stage 552 is complete, method 550 proceeds to stage 554 where variable sum is set to zero. In an alternate embodiment, not shown, stage 554 may be completed before stage 552. Once stage 554 is complete, method 550 proceeds to stage 556.

At stage 556, a check is performed to see if the label of the nearest neighbor descriptor $y_j$ is equivalent to the label of the local descriptor $x_i$. If the labels are equal, method 550 proceeds to stage 558. If the labels are not equal, method 550 jumps to stage 560.

At stage 558, sum is incremented by its previous value plus the quantity $2*(m-j)/(m*(m+1))$, where m equals to the total number of nearest neighbor descriptors, as described above in method 400. Once this is complete, method 550 proceeds to stage 560.

At stage 560, a check is performed to see if j equals to m. If j and m are equal, method 550 jumps to stage 564. If j and m are not equal, method 550 proceeds to stage 562.

At stage 562, j is incremented by one. Once this is complete, method 550 returns to stage 556.

At stage 564, sum is returned as the weighted quality score of local descriptor $x_i$. Once this is complete, method 550 ends.

Stages 552, 554, 556, 558, 560, 562, and 564 may be implemented as software, hardware, firmware, or any combination thereof.

Figure 6:
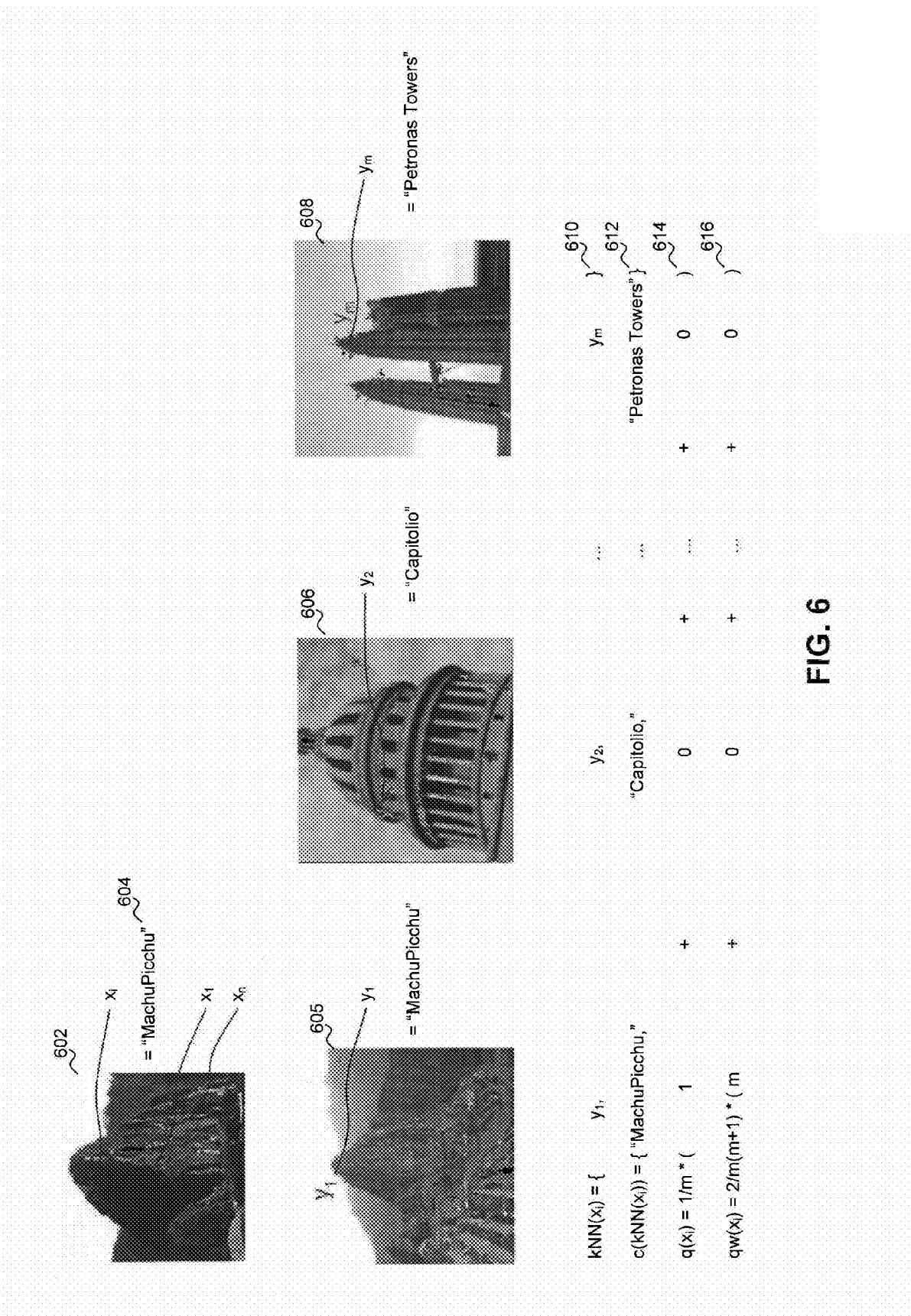
FIG. 6 is an example descriptor performance estimate according to an embodiment of the present invention.

FIG. 6 is an exemplary descriptor performance estimation according to an embodiment of the present invention. As an example, FIG. 6 may graphically represent stages 402, 404, 406, 408, 410, 412, 414, 416, and 418 of FIG. 4. In this case, FIG. 6 shows an image 602. Image 602 is described by a label 604 titled "MachuPicchu," and three local descriptors $x_l$, $x_i$, and $x_n$. In an embodiment, local descriptors $x_l$, $x_i$, and $x_n$ were located by an interest point detector.

Below image 602 are three other images: image 605, image 606, and image 608. Images 605, 606, and 608 represent images from which nearest neighbor descriptors $y_1$, $y_2$, and $y_m$ were found, respectively. Equation 610 shows nearest neighbor descriptors $y_1$, $y_2$, and $y_m$ in a list format, while equation 612 displays the labels that correspond to each nearest neighbor descriptor $y_1$, $y_2$, and $y_m$.

Equation 614 displays the quality score calculation for local descriptor $x_i$, with m referring to the total number of nearest neighbor descriptors. Since image 605 also has a label titled "MachuPicchu," a "1" is listed in equation 614 under image 605. Images 606 and 608 have "0" listed below them in equation 614 since their labels do not match image 602's label, "MachuPicchu." If only three nearest neighbor descriptors are present, then the quality score in this case would be ⅓.

Equation 616 displays the weighted quality score calculation for local descriptor $x_i$, with m referring to the total number of nearest neighbor descriptors. Again, since image 605 also has a label titled "MachuPicchu," an "m" is listed in equation 616 under image 605. Images 606 and 608 have "0" listed below them in equation 614 since their labels do not match image 602's label, "MachuPicchu." If only three nearest neighbor descriptors are present, then the weighted quality score in this case would be ½. In this example, the weighted quality score is greater than the quality score since nearest neighbor descriptor $y_i$ of image 605 is considered the closest nearest neighbor descriptor to the local descriptor, $x_i$.

Computer Systems

Figure 7:
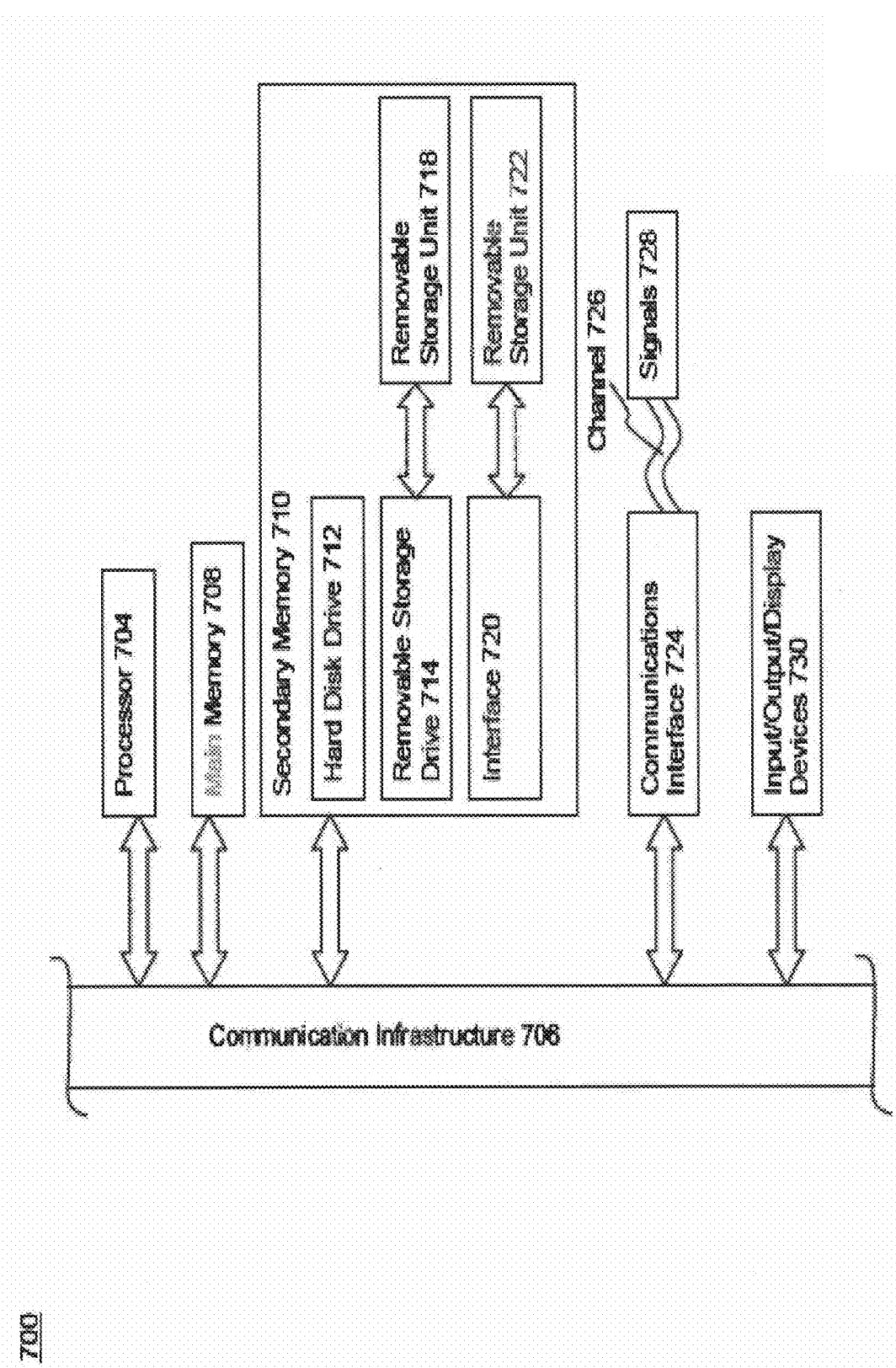
FIG. 7 is an architecture diagram of an exemplary computer system for estimating local descriptor performance according to an embodiment of the present invention.

The present invention may be implemented using hardware, software or a combination thereof and may be implemented in a computer system or other processing system. In an embodiment, the invention is directed toward a computer program product executing on a computer system capable of carrying out the functionality described herein, e.g., the functionality of FIG. 4. An example of a computer system 700 is shown in FIG. 7. The computer system 700 includes one or more processors, such as processor 704. The processor 704 is connected to a communication bus 706. Various software embodiments are described in terms of this example computer system. After reading this description, it will become apparent to a person skilled in the relevant art how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, memory card, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface, a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 enables computer 700 to communicate with external and/or remote devices. For example, communication interface 724 allows software and data to be transferred between computer system 700 and external devices. Communication interface 724 also allows computer 700 to communicate over communication networks, such as LANs, WANs, the Internet, etc. Communication interface 724 may interface with remote sites or networks via wired or wireless connections. Examples of communications interface 724 may include a modem, a network interface (such as an Ethernet card), a communications port, a PCMCIA slot and card, etc. Computer 700 receives data and/or computer program products via communication network 724. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 714, and a hard disk installed in hard disk drive 712. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard disk drive 712 or communications interface 724. The control logic (software), when executed by the processor 704, causes the processor 704 to perform the functions of the invention as described herein.

Computer 700 also includes input/output/display devices 732, such as monitors, keyboards, pointing devices, etc.

The invention can work with software, hardware, and operating system implementations other than those described herein. Any software, hardware, and operating system implementations suitable for performing the functions described herein can be used.

CONCLUSION

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system, comprising:
a descriptor processor, configured to receive a local descriptor describing a first object in an image with a respective local label that refers to the first object in the image described by the local descriptor, to receive one or more nearest neighbor descriptors with respective labels, wherein each of the nearest neighbor descriptors meets a threshold measure of similarity to the local descriptor in a database of descriptors and each of the nearest neighbor descriptors describes an object in an image different from the image and has a respective label that refers to the object, and to determine an efficacy of the local descriptor in identifying the first object based on a quality score of the local descriptor and a number of all nearest neighbor descriptors; and
a score calculator in communication with the descriptor processor and configured to calculate the quality score for a local descriptor is based on a number of nearest neighbor descriptors with a label equivalent to the label of the local descriptor, and further configured to provide the quality score to the descriptor processor.

2. The system of claim 1, wherein the efficacy determination comprises comparison of the quality score to a first quality score threshold.

3. The system of claim 1, wherein the quality score is calculated based on a ratio between a number of nearest neighbor descriptors with labels that are equivalent to the local label and the number of all the nearest neighbor descriptors.

4. The system of claim 1, wherein the quality score satisfies a formula $$\frac{2}{m(m+1)}\sum_{f=0}^{m-1}(m-f)\forall f:c(y_f)=c(x),$$

m is the number of all nearest neighbor descriptors, $y_j$ is a nearest neighbor descriptor, $c(y_j)$ is a nearest label of nearest neighbor descriptor $y_j$, and $c(x)$ is a local label.

5. The system of claim 1, wherein the nearest neighbor descriptors are ordered according to their respective measure of similarity to the local descriptor in a database of descriptors.

6. The system of claim 1, wherein the nearest neighbor descriptors are organized in a kd-tree according to their respective measure of similarity to the local descriptor.

7. The system of claim 1, wherein the quality score is provided to the descriptor processor only if the quality score exceeds a second quality score threshold.

8. The system of claim 7, wherein the second quality score threshold is determined based on previously calculated quality scores.

9. The system of claim 1, wherein the nearest neighbor descriptors comprise local descriptors relating to objects that have characteristics similar to the object related to the local descriptor.

10. A method of estimating performance of a local descriptor, comprising:

(a) receiving a local descriptor describing a first object in a first image with a respective local label that refers to the first object in the first image described by the local descriptor;

(b) identifying one or more nearest neighbor descriptors with respective labels, wherein each of the nearest neighbor descriptors meets a threshold measure of similarity to the local descriptor in a database of descriptors and each of the nearest neighbor descriptors describes an object in an image different from the first image and has a respective label that refers to the object;

(c) calculating a quality score for the local descriptor based on a number of nearest neighbor descriptors with a label equivalent to the label of the local descriptor and a number of all nearest neighbor descriptors; and (d) determining, based on the quality score, if the local descriptor is effective in identifying the object.

11. The method of claim 10, wherein said stage (d) comprises comparing the quality score to a quality score threshold.

12. The method of claim 11, wherein said stage (d) further comprises determining the quality score threshold based on previously calculated quality scores.

13. The method of claim 11, wherein said stage (c) comprises calculating the quality score is calculated based on a ratio between a number of nearest neighbor descriptors with labels that are equivalent to the local label and the number of all the nearest neighbor descriptors.

14. The method of claim 10, wherein the quality score satisfies a formula $$\frac{2}{m(m+1)}\sum_{f=0}^{m-1}(m-f)\forall f: c(y_f) = c(x),$$

m is the number of all nearest neighbor descriptors, $y_j$ is a nearest neighbor descriptor, $C(y_j)$ is a nearest label of nearest neighbor descriptor $y_j$, and $C(x)$ is a local label.

15. The method of claim 10, wherein the identified one or more nearest neighbor descriptors are ordered according to their respective measure of similarity in a database of descriptors to the local descriptor.

16. The method of claim 10, further comprising:

(e) organizing the identified nearest neighbor descriptors as a kd-tree according to their respective measure of similarity to the local descriptor, performed before stage (b), and wherein stage (b) comprises identifying the nearest neighbor descriptors using the kd-tree.

17. The method of claim 10, wherein (b) comprises identifying one or more local descriptors describing respective objects that have similar characteristics as the object described by the local descriptor.

18. An article of manufacture comprising a non-transitory computer readable medium encoding instructions thereon that, in response to execution by a processor, cause the processor to estimate the performance of a local descriptor using operations comprising:

(a) receiving a local descriptor describing a first object in a first image with a respective local label that refers to the first object in the first image described by the local descriptor;

(b) identifying one or more nearest neighbor descriptors with respective labels, wherein each of the nearest neighbor descriptors meets a threshold measure of similarity to the local descriptor in a database of descriptors and each of the nearest neighbor descriptors describes an object in an image different from the first image and has a respective label that refers to the object;

(c) calculating a quality score for the local descriptor based on a number of nearest neighbor descriptors with a label equivalent to the label of the local descriptor and a number of all nearest neighbor descriptors; and (d) determining, based on the quality score, if the local descriptor is effective in identifying the object.

* * * * *